(12) United States Patent
Nakashima et al.

(10) Patent No.: US 9,208,951 B2
(45) Date of Patent: Dec. 8, 2015

(54) CAPACITOR AND METHOD OF MANUFACTURING CAPACITOR

(71) Applicant: FUJITSU LIMITED, Kawasaki-shi, Kanagawa (JP)

(72) Inventors: Tomokazu Nakashima, Kawasaki (JP); Masayuki Itoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/553,488

(22) Filed: Nov. 25, 2014

(65) Prior Publication Data
US 2015/0213958 A1    Jul. 30, 2015

(30) Foreign Application Priority Data
Jan. 24, 2014    (JP) .................... 2014-011167

(51) Int. Cl.
| | |
|---|---|
| *H01L 27/108* | (2006.01) |
| *H01G 4/30* | (2006.01) |
| *H01G 4/12* | (2006.01) |
| *H01G 4/008* | (2006.01) |
| *H01G 4/018* | (2006.01) |

(52) U.S. Cl.
CPC ............... *H01G 4/30* (2013.01); *H01G 4/008* (2013.01); *H01G 4/018* (2013.01); *H01G 4/12* (2013.01)

(58) Field of Classification Search
CPC ....................................... H01G 4/30
USPC ........................................................ 257/306
See application file for complete search history.

(56) References Cited

U.S. PATENT DOCUMENTS
2010/0195262 A1    8/2010    Sasaki et al.

FOREIGN PATENT DOCUMENTS
| JP | 58-28821 | 2/1983 |
|---|---|---|
| JP | 3-79416 | 8/1991 |
| JP | 7-11461 | 2/1995 |
| JP | 2010-177659 | 8/2010 |

*Primary Examiner* — Anthony Ho
(74) *Attorney, Agent, or Firm* — Staas & Halsey LLP (57) ABSTRACT

A capacitor includes: dielectric layers including a first dielectric layer, a second dielectric layer, and at least one intermediate dielectric layer laminated between the first dielectric layer and the second dielectric layer; first interlayer electrode and second interlayer electrode arranged alternately with each other between at least two layers among the dielectric layers; a first external electrode disposed on lateral surfaces of the dielectric layers and coupled to the first interlayer electrode; and a second external electrode disposed on lateral surfaces of the dielectric layers and coupled to the second interlayer electrode, wherein the intermediate dielectric layer includes first internal electrodes coupled to the first interlayer electrode, arranged in a plane direction of the intermediate dielectric layer and spaced apart from each other, and second internal electrodes coupled to the second interlayer electrode, arranged alternately with the first internal electrodes and spaced apart from the first internal electrodes.

7 Claims, 9 Drawing Sheets

CAPACITOR AND METHOD OF MANUFACTURING CAPACITOR

CROSS-REFERENCE TO RELATED APPLICATIONS

This application is based upon and claims the benefit of priority from the prior Japanese Patent Application No. 2014-011167 filed on Jan. 24, 2014, the entire contents of which are incorporated herein by reference.

FIELD

Exemplary embodiments are related to a capacitor and a method of manufacturing the capacitor.

BACKGROUND

In a capacitor, internal electrodes are disposed above and below a thin ceramic sheet having a high permittivity such as a titanium oxide-based ceramic sheet or a barium titanate-based ceramic sheet. The capacitor has a structure in which a plurality of ceramic sheets is laminated, and a plurality of internal electrodes is coupled in parallel at the outside. Therefore, a large capacitance is obtained by the capacitor in a relatively small size.

Related technologies are disclosed in Japanese Laid-Open Patent No. 2010-177659, Japanese Laid-Open Patent No. S58-28821, or Japanese Laid-Open Utility Model No. H3-79416.

SUMMARY

According to one aspect of the embodiments, a capacitor includes: three or more dielectric layers including a first dielectric layer, a second dielectric layer, and at least one intermediate dielectric layer laminated between the first dielectric layer and the second dielectric layer; at least one first interlayer electrode and at least one second interlayer electrode which are arranged alternately with each other between at least two layers among the three or more dielectric layers; a first external electrode disposed on lateral surfaces of the three or more dielectric layers and coupled to the at least one first interlayer electrode; and a second external electrode disposed on lateral surfaces of the three or more dielectric layers and coupled to the at least one second interlayer electrode, wherein the intermediate dielectric layer includes first internal electrodes which are coupled to the first interlayer electrode, arranged in a plane direction of the intermediate dielectric layer and spaced apart from each other, and second internal electrodes which are coupled to the second interlayer electrode, arranged alternately with the first internal electrodes and spaced apart from the first internal electrodes.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The capacitance C, as indicated in the following equation, is proportional to the permittivity $\in$ of a dielectric, an area S and the number of laminated sheets of internal electrodes, and is inversely proportional to the thickness t of a dielectric.

$$\text{Capacitance } C = \text{dielectric permittivity } \in \times \text{internal electrodes area } S \times \text{number of laminated sheets/dielectric thickness } t$$

For example, the outer shape of a ceramic-laminated capacitor part may have, for example, a 1005 size (length 1.0 mm×width 0.5 mm×height 0.5 mm), or a 1608 size. In such a dimension, in order to increase the capacitance, an opposing area may be increased by increasing the number of the laminated sheets, or the dielectric thickness may be decreased.

For example, in order to increase the opposing area, there is provided a capacitor in which a plurality of electrode pieces is vertically disposed on a substrate surface. In manufacturing a capacitor, a Ni electrode is formed on a Ni seed layer, and then the Ni layer is etched and removed by Ni ion beam so that internal electrodes are insulated. For example, when the Ni layer is not completely removed, a necessary insulation distance cannot be secured, and thus the insulation performance of the capacitor may be deteriorated. For example, Ni atoms scattered by ion beam etching may be re-attached to the electrode pieces so that the width of an electrode gap may be narrowed. When a dielectric distance is decreased, a necessary insulation distance cannot be secured, and thus a voltage resistance may be deteriorated. When the electrode gap is prolonged in order to secure the insulation distance, a large capacitance may not be obtained. However, it is difficult to control the amount of re-attached Ni, and a required capacitance may not be obtained.

A transparent ceramic with a high optical transparency becomes a ferroelectric with a permittivity of about 1,000 F/m to 5,000 F/m according to a material composition. When a raw material produced in a block form is thinned in a sheet form, a cut-out of a block is processed by, for example, an optical polishing or a chemical etching. However, a thickness limit may be about 20 μm. Therefore, it may be difficult to increase the capacitance by a limited dimension.

A capacitor using a transparent dielectric material is used as a trimming capacitor in which a part of an electrode is cut out by laser to adjust a capacitance. In such a capacitor, it is desirable that a capacitance before trimming is large. However, the size of an opposing area may not exceed the size of a part. Since dielectrics and electrodes are formed on a substrate, it is difficult to structurally reduce the dielectric thickness, and it may be difficult to increase the capacitance by a limited dimension.

A capacitor may have at least three or more dielectric layers, at least one first interlayer electrode, at least one second interlayer electrode, a first external electrode, and a second external electrode, and, as required, may include other members.

The three or more dielectric layers include a first dielectric layer, a second dielectric layer, and one or more intermediate dielectric layers. The one or more intermediate dielectric layers are laminated between the first dielectric layer and the second dielectric layer. The three or more dielectric layers may have an optical transparency. For example, when an electrode is cut out by laser, an effective electrode area may be varied so that a capacitance adjustment of the capacitor may be performed in a wide range. Further, the capacitance of the capacitor may be finely adjusted.

The first dielectric layer may be a dielectric layer located at one end of a laminated body having three or more dielectric layers. The second dielectric layer may be a dielectric layer located at an opposite end to the first dielectric layer of the laminated body having three or more dielectric layers.

There is no particular limitation in the material of the first dielectric layer, and the second dielectric layer, and the material may be properly selected according to purposes and may be, for example, ceramic. As for the ceramic, for example, PLZT (lead lanthanum zircornate titanate), $Al_2O_3$—$SiO_2$-based (mullite), YAG ($Y_3Al_5O_{12}$, yttrium-aluminum-garnet), or $Y_2O_3$ (yttrium oxide) may be used.

The size and shape of the first dielectric layer and the second dielectric layer are not particularly limited and may be properly set according to purposes.

The average thickness of the first dielectric layer and the second dielectric layer is not particularly limited and may be properly set according to purposes. For example, in order to obtain a large capacitance, or in order to facilitate the production, the average thickness may be in a range from 20 μm to 100 μm, or, for example, in a range from 30 μm to 70 μm.

The one or more intermediate dielectric layers include, in each layer, (a) first internal electrodes which are coupled to the first interlayer electrode, and arranged in the plane direction of the intermediate dielectric layers to be spaced apart from each other, and (b) second internal electrodes which are couoled to the second interlayer electrode, and arranged alternately with the first internal electrodes to be spaced apart from the first internal electrodes. In such a configuration, the intermediate dielectric layer itself may be a small laminated capacitor.

In the intermediate dielectric layers, there is no particular limitation in the material of the dielectric, and the material may be properly selected according to purposes and may be, for example, ceramic. As for the ceramic, for example, PLZT (lead lanthanum zircornate titanate), $Al_2O_3$—$SiO_2$-based (mullite), YAG ($Y_3Al_5O_{12}$, yttrium-aluminum-garnet), or $Y_2O_3$ (yttrium oxide) may be used. In the intermediate dielectric layers, within a layer including the dielectric made of such a material, the first internal electrodes and the second internal electrodes are formed.

The size and shape of the intermediate dielectric layers are not particularly limited and may be properly set according to purposes.

The average thickness of the intermediate dielectric layers is not particularly limited and may be properly set according to purposes. In order to obtain a large capacitance, or in order to facilitate the production, the average thickness may be in a range from 10 μm to 30 μm, or, for example, in a range from 15 μm to 25 μm.

The material for the first internal electrodes and the second internal electrodes is not particularly limited, and may be properly selected according to purposes. For example, Au, Ag, Cu, Ni, Ag—Pt alloy, or Ag—Pd alloy may be used.

The average thickness of the first internal electrodes and the second internal electrodes is not particularly limited and may be properly set according to purposes. The average thickness may be, for example, in a range from 1 μm to 2 μm.

The distance between the first internal electrode and the second internal electrode is not particularly limited and may be properly set according to purposes. In order to secure an insulation distance, the distance may be 1 μm or more. In order to secure the insulation distance and to obtain a large capacitance, the distance may range from 1 μm to 2 μm.

The distance between an end portion of the first internal electrode at the surface side of the intermediate dielectric layer in contact with the second interlayer electrode and the second interlayer electrode in contact with the intermediate dielectric layer may range from 2 μm to 3 μm. The distance between an end portion of the second internal electrode at the surface side of the intermediate dielectric layer in contact with the first interlayer electrode and the first interlayer electrode in contact with the intermediate dielectric layer may range from 2 μm to 3 μm. The insulation distance may be secured and a large capacitance may be obtained.

The at least one first interlayer electrode and the at least one second interlayer electrode may be arranged alternately with each other between at least two layers among the three or more dielectric layers.

The material for the first interlayer electrode and the second interlayer electrode is not particularly limited, and may be properly selected according to purposes. For example, Au, Ag, Cu, Ni, Ag—Pt alloy or Ag—Pd alloy may be used.

The size of the first interlayer electrode and the second interlayer electrode is not particularly limited and may be properly set according to purposes. The average thickness of the first interlayer electrode and the second interlayer electrode is not particularly limited and may be properly set according to purposes. The average thickness may be in a range from 0.5 μm to 3 μm, or for example, in a range from 1 μm to 2 μm.

The first external electrode may be disposed at the lateral surfaces of the three or more dielectric layers to be coupled to the at least one first interlayer electrode. The second external electrode may be disposed at the lateral surfaces of the three or more dielectric layers to be coupled to the at least one second interlayer electrode. The lateral surface on which the second external electrode is disposed may be a lateral surface opposite to the lateral surface on which the first external electrode is disposed. The lateral surface may be, for example, a plane along the lamination direction of the three or more dielectric layers.

The material for the first external electrode and the second external electrode is not particularly limited, and may be properly selected according to purposes. For example, Au, Ag, Cu, Ni, Ag—Pt alloy or Ag—Pd alloy may be used.

The size of the first external electrode is not particularly limited and may be properly set according to purposes. For example, the size may correspond to, for example, the size of the entire lateral surfaces of the three or more dielectric layers on which the first external electrode is disposed. The size of the second external electrode is not particularly limited and may be properly selected according to purposes. For example, the size may correspond to, for example, the size of the entire lateral surfaces of the three or more dielectric layers on which the second external electrode is disposed.

The average thickness of the first external electrode and the second external electrode is not particularly limited and may be properly set according to purposes.

A method of manufacturing the capacitor is not particularly limited, and may be properly selected according to purposes.

The capacitor includes the first internal electrodes, and the second internal electrodes in the intermediate dielectric layers, and thus a high capacitance may be achieved. Since the first internal electrodes and the second internal electrodes are spaced apart from each other with a high precision, an insulation distance is secured to obtain a high voltage resistance.

In the capacitor, while a capacitance is measured, interlayer electrodes seen from outside are trimmed. Thus, a capacitance may be adjusted with a high precision. When the dielectric layer of the capacitor is optically transparent in its entirety, a plurality of interlayer electrodes is trimmed. Thus, adjustment of the capacitance may be performed in a wide range.

A method of manufacturing the capacitor includes at least a process of forming intermediate dielectric layers, and may further include other processes as required.

In the process of forming the intermediate dielectric layers, first internal electrode forming grooves and second internal electrode forming grooves are formed. The first internal electrode forming grooves are directed from one surface of a layered dielectric toward the inside of the dielectric, and the second internal electrode forming grooves are directed from an opposite surface to the one surface of the layered dielectric toward the inside of the dielectric and arranged alternately with the first internal electrode forming grooves. An electrode material is filled in the first internal electrode forming grooves and in the second internal electrode forming grooves. The process of forming the intermediate dielectric layers is not particularly limited, and may be properly selected according to purposes.

In order to facilitate the production and form the grooves with a high precision, the first internal electrode forming grooves and the second internal electrode forming grooves may be formed by any one of an ion beam processing, and an etching processing using photolithography.

In order to facilitate the production, a paste-type conductive material may be filled in the first internal electrode forming grooves and in the second internal electrode forming grooves, and heat-treated.

As the conductive material, for example, Au, Ag, Cu, Ni, Ag—Pt alloy or Ag—Pd alloy may be used.

The temperature and time for the heat treatment are not particularly limited and may be properly selected according to purposes.

In the process of forming the intermediate dielectric layers, the first internal electrode forming grooves and the second internal electrode forming grooves are formed with a high precision, and the electrode material is filled in the grooves with a high precision. Therefore, the intermediate dielectric layers may be formed with a high precision.

As the dielectric, a capacitor employing optically transparent ceramic may be manufactured. At process (1), a block of an optically transparent ceramic is sintered. The sintering condition is not particularly limited, and may be properly set according to purposes. After the sintering, the block is cut out, optically polished, and chemically etched so that an optically transparent ceramic sheet with a thickness which is easy to be processed may be obtained.

At process (2), an ion beam processing or etching by photolithography is performed on the optically transparent ceramic sheet so that first internal electrode forming grooves and second internal electrode forming grooves, with a certain width and a certain depth, may be formed in the optically transparent ceramic sheet.

At process (3), a paste-type conductive material is filled in the first internal electrode forming grooves and the second internal electrode forming grooves. Then, by, for example, heat-curing or sintering, the first internal electrodes are formed in the first internal electrode forming grooves and the second internal electrodes are formed in the second internal electrode forming grooves.

At step (4), a first interlayer electrode is formed on one surface of the optically transparent ceramic sheet which may correspond to a second dielectric layer. A second interlayer electrode is formed by, for example, sputtering or a thick film printed layer, on one surface of the optically transparent ceramic sheet in which the first internal electrodes and the second internal electrodes are formed. A first interlayer electrode is formed by, for example, sputtering or a thick film printed layer, on one surface of another optically transparent ceramic sheet.

At step (5), the optically transparent ceramic sheets on which the interlayer electrodes are formed are arranged such that the first interlayer electrodes and the second interlayer electrodes are arranged alternately with each other between the optically transparent ceramic sheets. The optically transparent ceramic sheets are bonded to each other by, for example, a transparent adhesive or anodic bonding.

At step (6), the bonded optically transparent ceramic sheets are divided into pieces with certain sizes by, for example, laser scribing or dicing.

At step (7), a first external electrode is formed on one lateral surface of the laminated body of the optically transparent ceramic sheets as a divided piece, and a second external electrode is formed on the other lateral surface. Here, the first external electrode and the second external electrode may be formed such that the first interlayer electrodes are coupled to the first external electrode, and the second interlayer electrodes are coupled to the second external electrode. The formation of the first external electrode and the second external electrode may be performed by coating, for example, Ni paste and sintering the coated Ni paste.

In the method of manufacturing the capacitor, the process (6) may be performed between the process (2) and the process (3), between the process (3) and the process (4), or between the process (4) and the process (5).

Figure 1A:
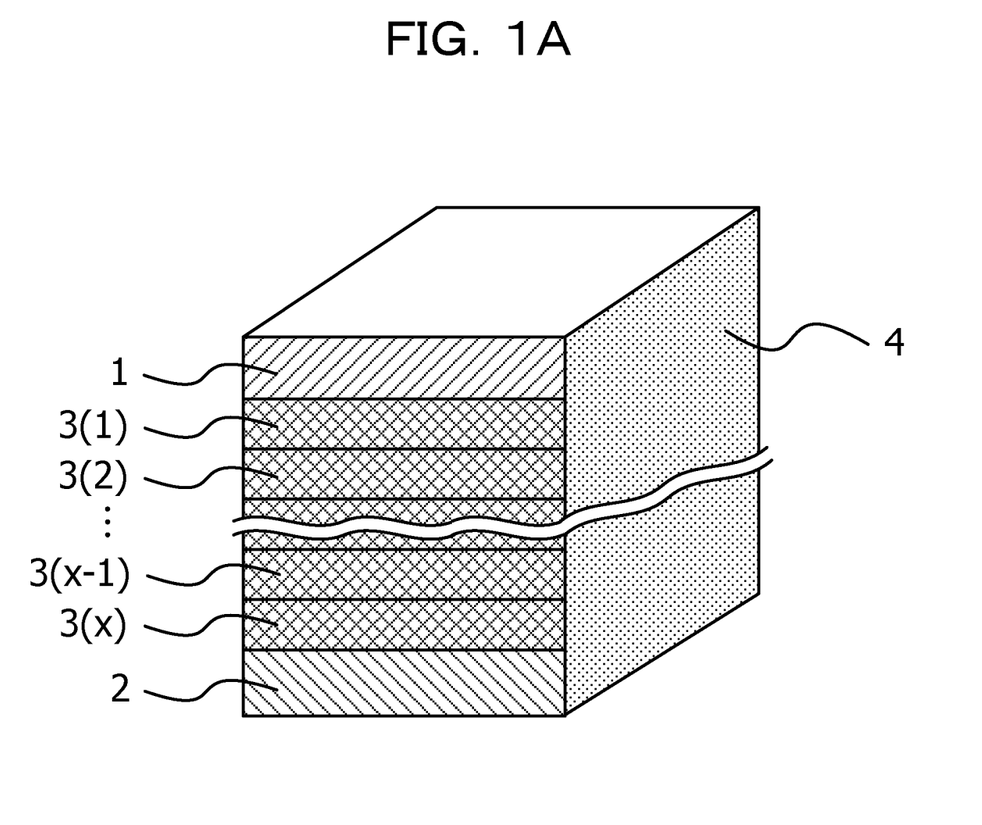
FIG. 1A illustrates an example of a capacitor.

In the drawings to be described later, the same reference numerals indicate substantially the same or similar components. FIG. 1A illustrates an example of a capacitor. The capacitor illustrated in FIG. 1A includes, for example, a first dielectric layer 1 disposed on the top, a second dielectric layer 2 disposed on the bottom, and x intermediate dielectric layers 3(1) to 3(x) laminated between the first dielectric layer 1 and the second dielectric layer 2. The capacitor may be a laminated body including x+2 dielectric layers. On the entire lateral surface of the laminated body, a first external electrode 4 is formed. On the entire surface of the opposite lateral surface to the lateral surface on which the first external electrode 4 is formed, a second external electrode is formed. First interlayer electrodes and second interlayer electrodes are arranged alternately with each other between the x+2 dielectric layers. The first interlayer electrodes are coupled to the first external electrode 4. The second interlayer electrodes are coupled to the second external electrode.

Figure 1B:
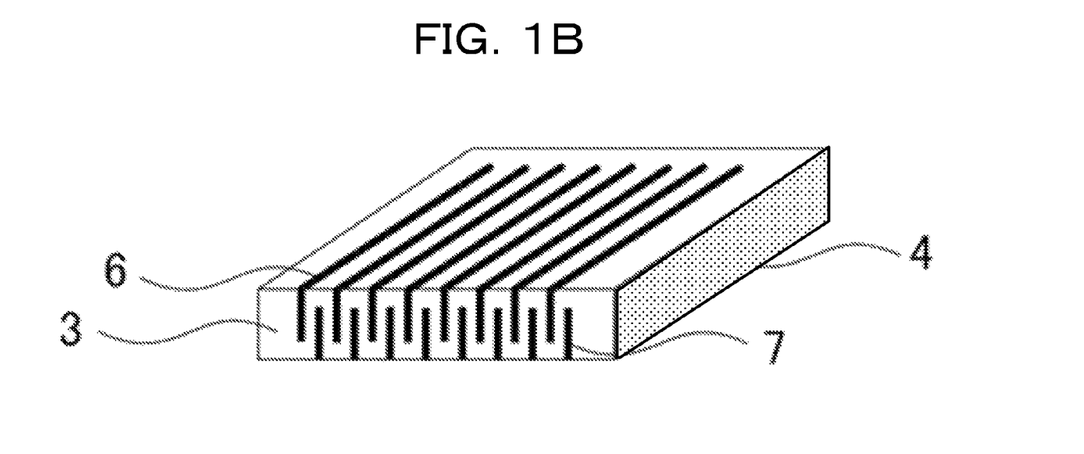
FIG. 1B illustrates an example of an intermediate dielectric layer.

FIG. 1B illustrates an example of an intermediate dielectric layer. FIG. 1B illustrates a perspective cross-sectional view of the intermediate dielectric layer 3 of the capacitor illustrated in FIG. 1A. In the intermediate dielectric layer 3, first internal electrodes 6 and second internal electrodes 7 are formed. The first internal electrodes 6 are exposed to one surface of the intermediate dielectric layer 3, and coupled to the first interlayer electrode. The second internal electrodes 7 are exposed to the other surface of the intermediate dielectric layer 3, and coupled to the second interlayer electrode. The first internal electrodes 6 and the second internal electrodes 7 are arranged alternately with each other in the layer.

Figure 1C:
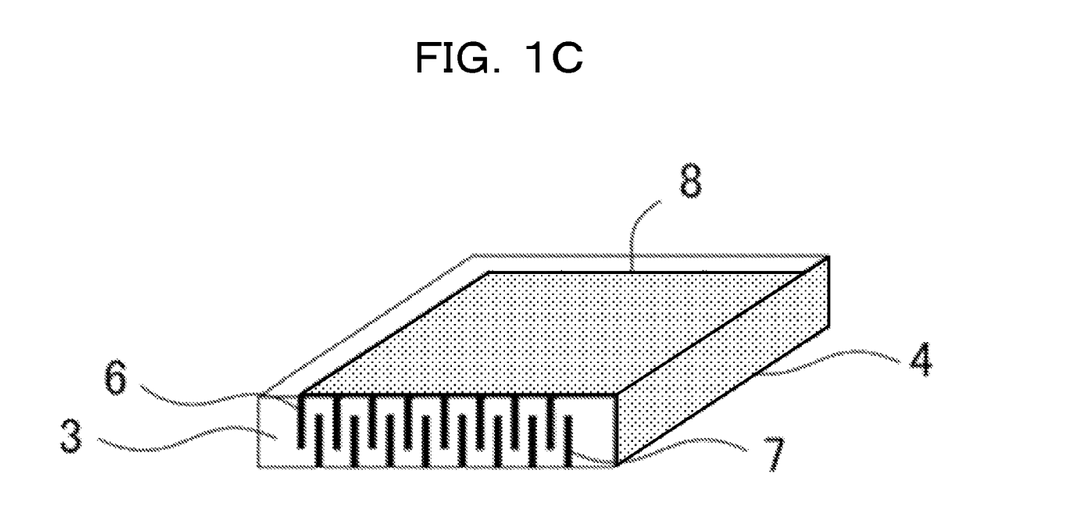
FIG. 1C illustrates an example of an intermediate dielectric layer and a first interlayer electrode.

FIG. 1C illustrates an example of an intermediate dielectric layer and a first interlayer electrode. FIG. 1C illustrates a perspective cross-sectional view of the intermediate dielectric layer 3 and the first interlayer electrode 8 of the capacitor of FIG. 1A. The first internal electrodes 6 are coupled to the first interlayer electrode 8 in contact with the one surface of the intermediate dielectric layer 3. The first interlayer electrode 8 is coupled to the first external electrode 4.

Figure 1D:
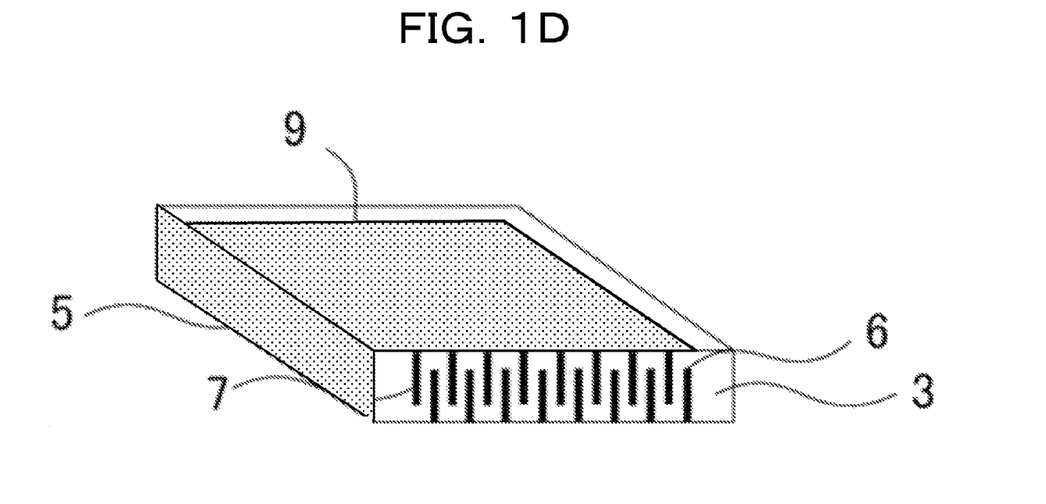
FIG. 1D illustrates an example of an intermediate dielectric layer and a second interlayer electrode.

FIG. 1D illustrates an example of an intermediate dielectric layer and a second interlayer electrode. FIG. 1D illustrates a perspective cross-sectional view of the intermediate dielectric layer 3 and the second interlayer electrode 9 of the capacitor of FIG. 1A. The second internal electrodes 7 are coupled to the second interlayer electrode 9 in contact with the one surface of the intermediate dielectric layer 3. The second interlayer electrode 9 is coupled to the second external electrode 5.

Figure 1E:
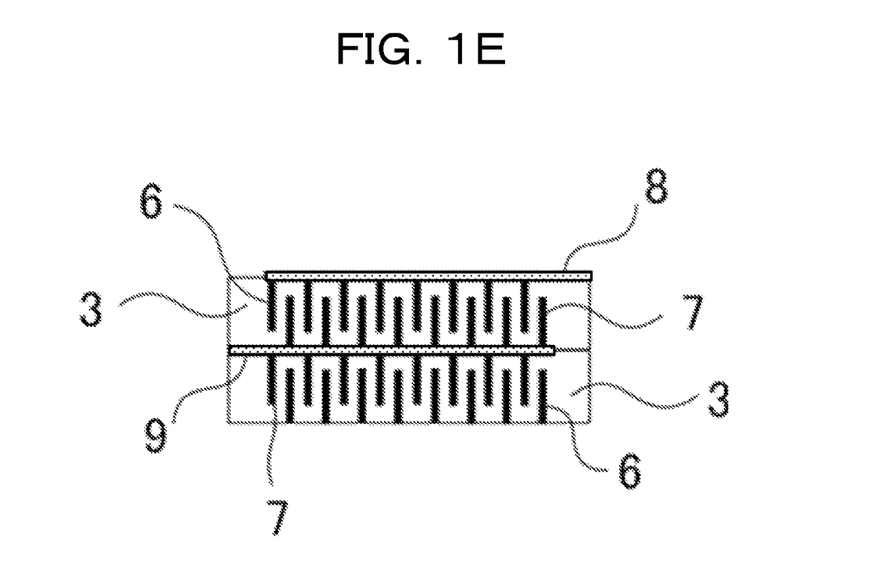
FIG. 1E illustrates an example of laminated intermediate dielectric layers.

FIG. 1E illustrates an example of laminated intermediate dielectric layers. FIG. 1E illustrates a cross-sectional view of two intermediate dielectric layers laminated in the capacitor of FIG. 1A. Also, in the cross-sectional view illustrated in FIG. 1E, the intermediate dielectric layer 3 and the first interlayer electrode 8 of FIG. 1C, and the intermediate dielectric layer 3 and the second interlayer electrode 9 of FIG. 1D are laminated. For example, the intermediate dielectric layer 3 of FIG. 1C and the intermediate dielectric layer 3 of FIG. 1D has a relationship between a-th layer and a+1-th layer, respectively in the laminated body of the x intermediate dielectric layers. In such a relationship, an opposite surface to the surface with the first interlayer electrode 8 of the intermediate dielectric layer 3 of FIG. 1C is in contact with the second interlayer electrode 9 of FIG. 1D, and the second internal electrodes 7 in the intermediate dielectric layer 3 of FIG. 1C are coupled to the second interlayer electrode 9 of FIG. 1D.

The capacitance of a capacitor chip with a component size of 1608 (1.6 mm×0.8 mm×0.8 mm) is as follows.

For example, the capacitance of a capacitor which does not include the first internal electrodes and the second internal electrodes in the intermediate dielectric layer may be estimated.

Figure 2A:
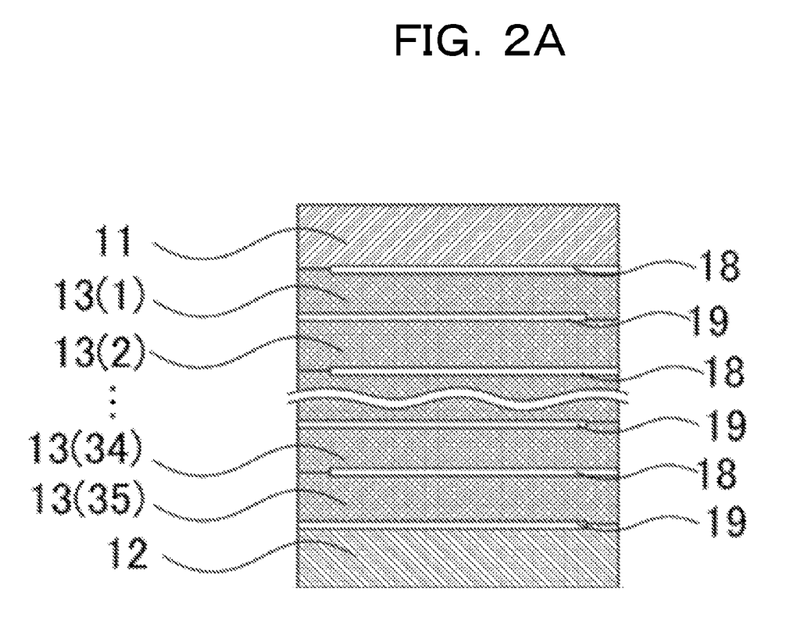
FIGS. 2A to 2D illustrate an example of a capacitor.
Figure 2B:
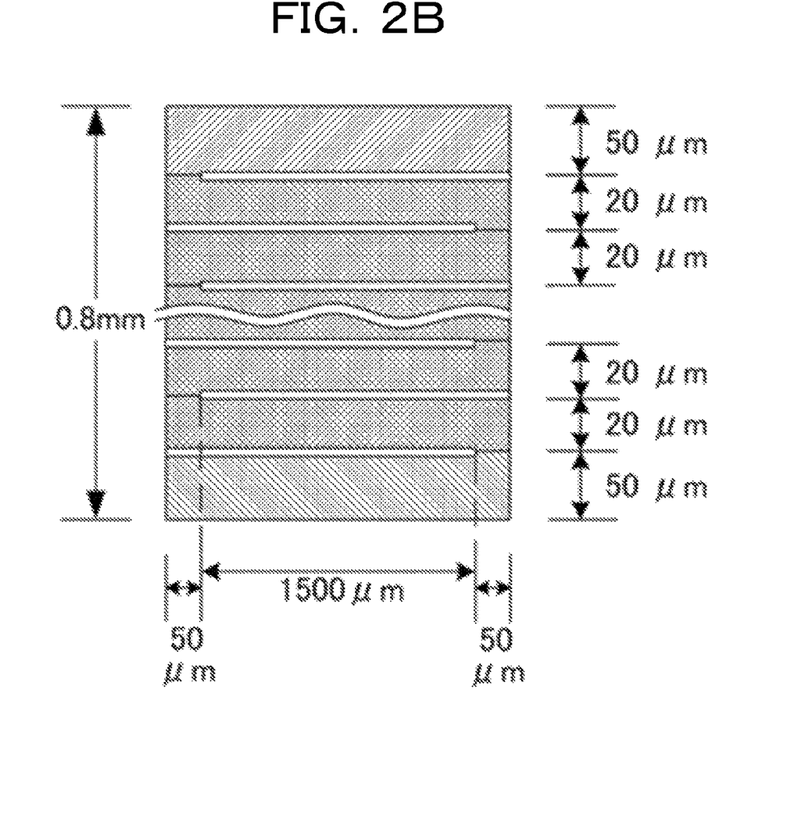
Figure 2C:
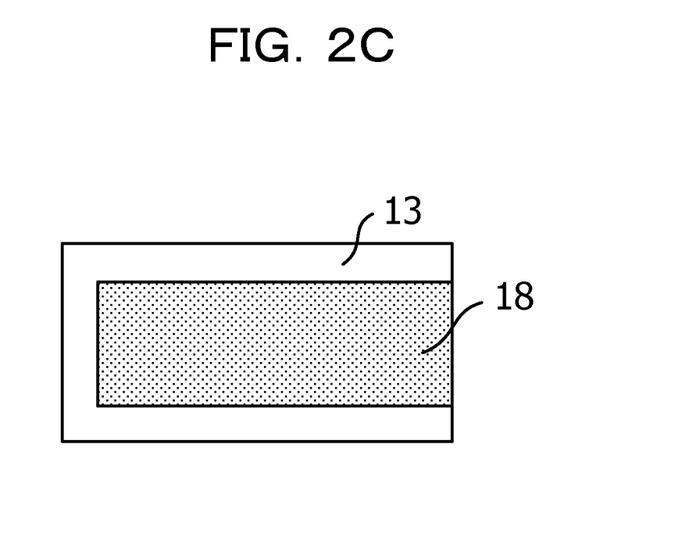
Figure 2D:
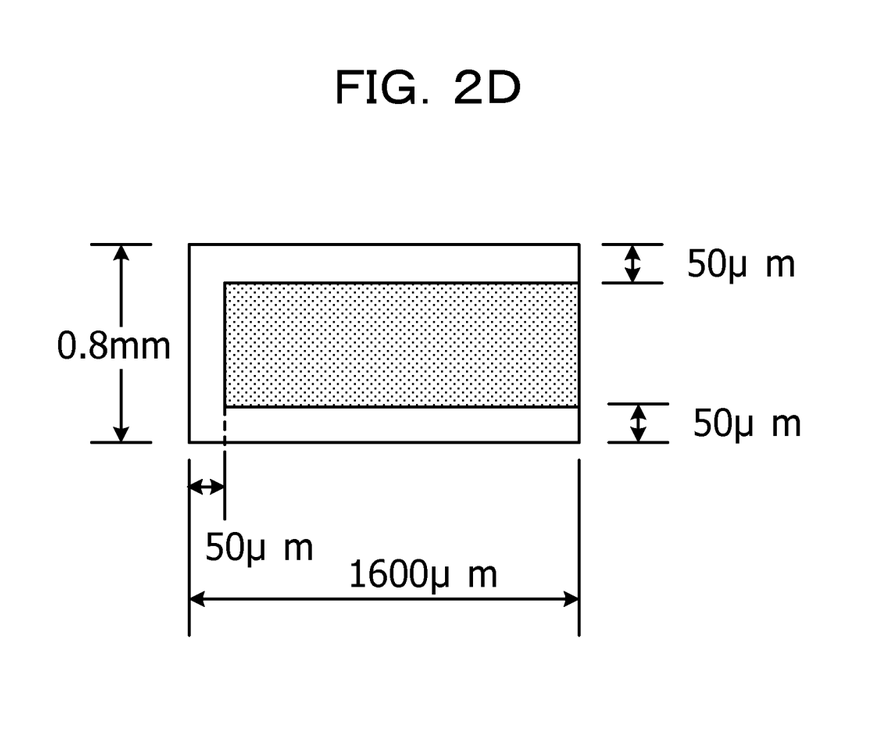

FIGS. 2A to 2D illustrate an example of a capacitor. FIG. 2A illustrates a cross-sectional view of the capacitor. FIG. 2B illustrates a dimension view of the capacitor of FIG. 2A. FIG. 2C illustrates a top view of an intermediate dielectric layer 13 and a first interlayer electrode 18. FIG. 2D illustrates a dimension view of FIG. 2C. The capacitor illustrated in FIG. 2A includes, for example, a second dielectric layer 12 disposed on the bottom, a first dielectric layer 11 disposed on the top, and 35 intermediate dielectric layers 13(1) to 13(35) disposed between the first dielectric layer 11 and the second dielectric layer 12. Between the respective dielectric layers, first interlayer electrodes 18 and second interlayer electrodes 19 are arranged alternately with each other. The capacitance $C_1$ of the capacitor illustrated in FIGS. 2A to 2D may be estimated by the following equation.

$$C_1 = \varepsilon \frac{S \times M}{t} = \varepsilon \frac{(700 \times 1500) \times 35}{20}$$

∈ denotes a permittivity of a dielectric layer, S denotes an area (μm²) of an interlayer electrode, M denotes the number of laminated intermediate dielectric layers, and t denotes a thickness (μm) of the dielectric layer.

In the capacitor to be disclosed below, the capacitance is estimated when the capacitor has the same interlayer electrode area and the same number of laminated dielectric layers as those of the above-described capacitor.

Figure 3A:
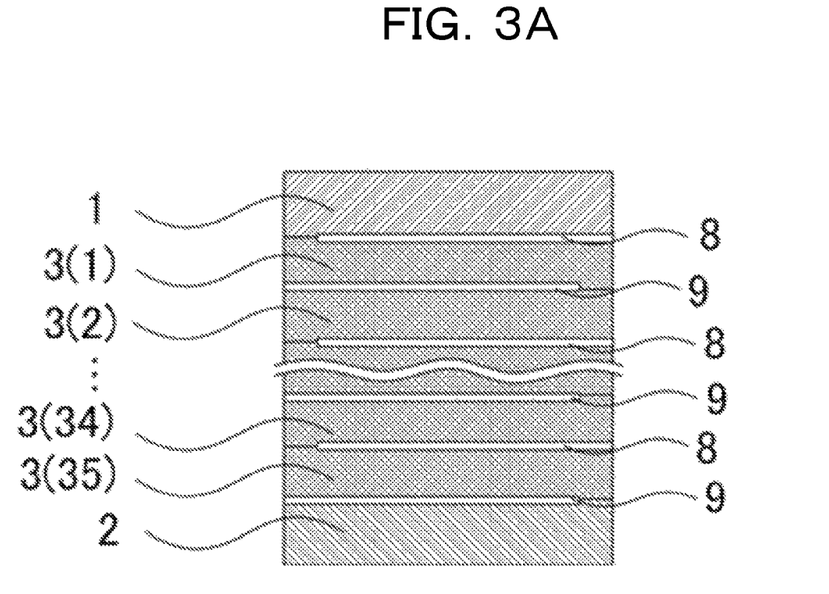
FIGS. 3A to 3H illustrate an example of a capacitor.
Figure 3B:
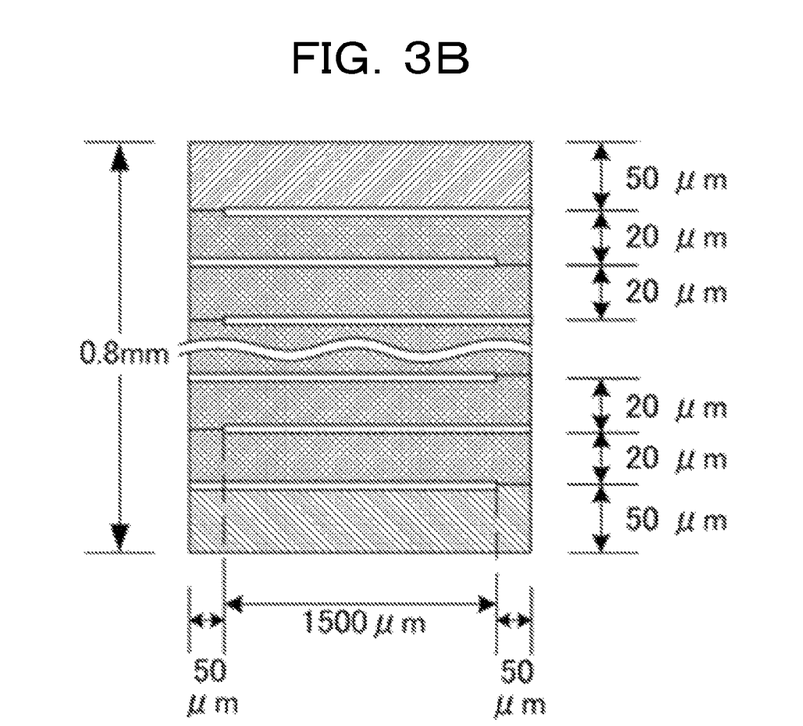
Figure 3C:
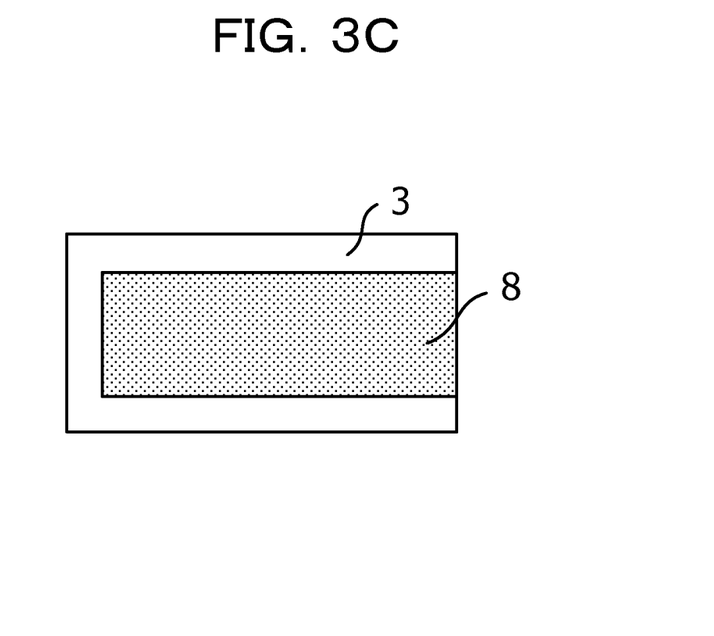
Figure 3D:
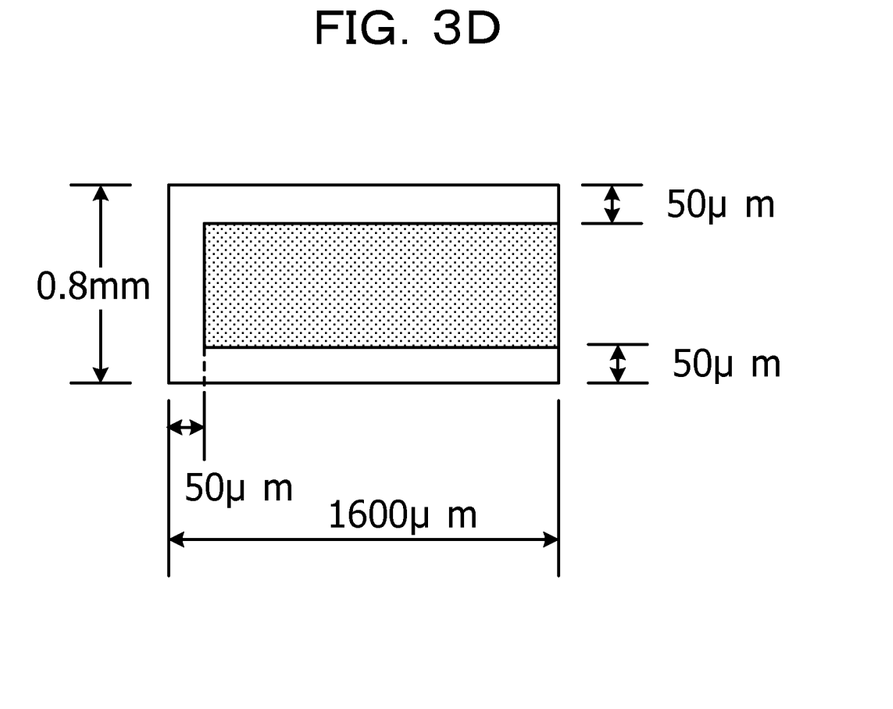
Figure 3E:
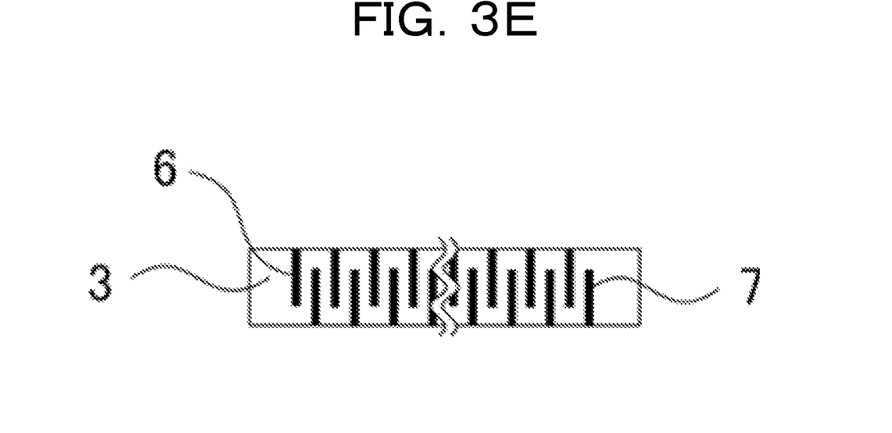
Figure 3F:
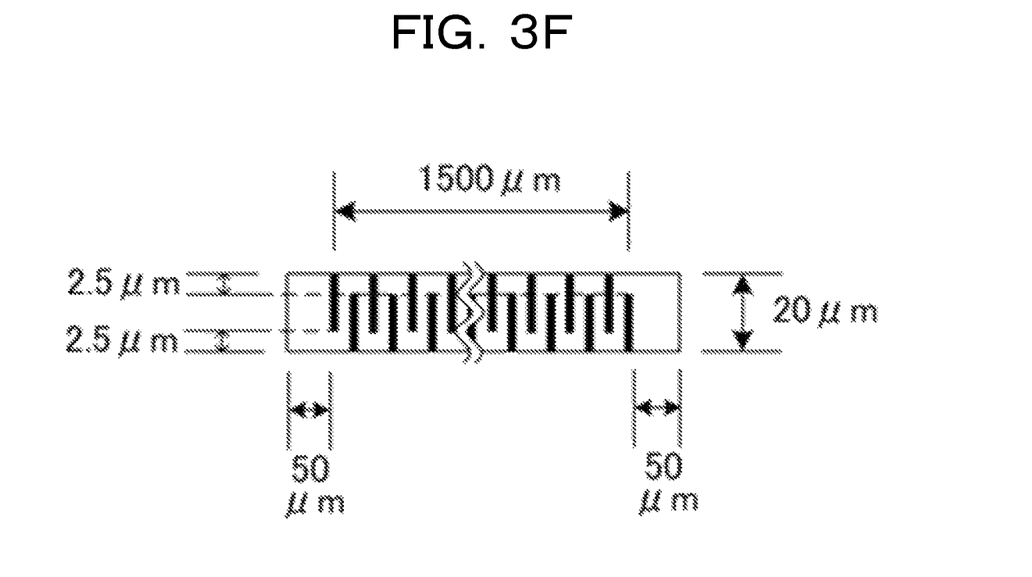
Figure 3G:
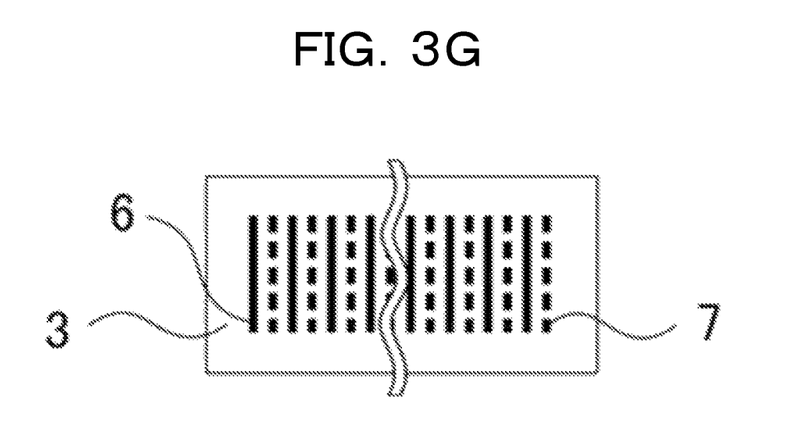
Figure 3H:
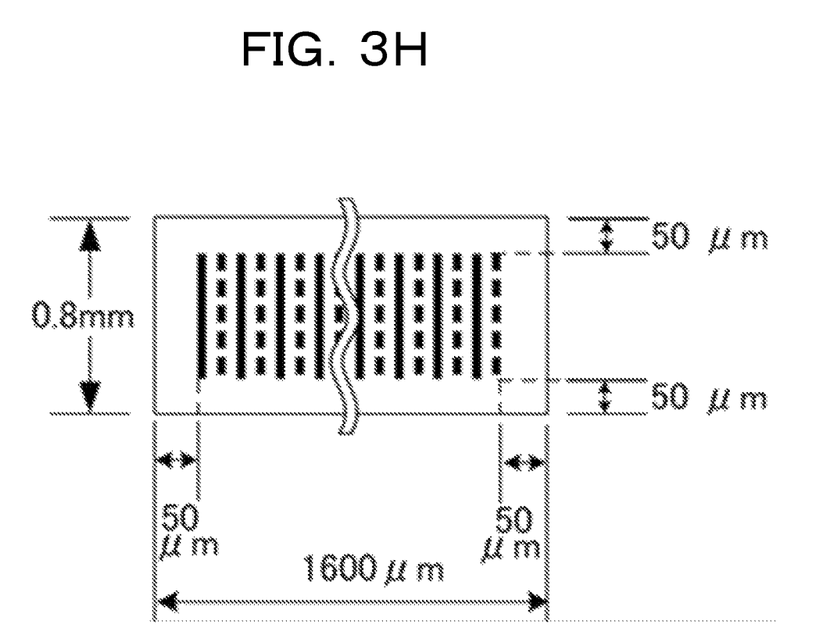

FIGS. 3A to 3H illustrate an example of a capacitor. FIG. 3A illustrates a cross-sectional view of the capacitor. FIG. 3B illustrates a dimension view of the capacitor of FIG. 3A. FIG. 3C illustrates a top view of an intermediate dielectric layer 3 and a first interlayer electrode 8. FIG. 3D illustrates a dimension view of FIG. 3C. FIG. 3E illustrates a cross-sectional view of the intermediate dielectric layer 3. FIG. 3F illustrates a dimension view of FIG. 3E. FIG. 3G illustrates a plan view of the intermediate dielectric layer 3. FIG. 3H illustrates a dimension view of FIG. 3G. The capacitor illustrated in FIG. 3A includes, for example, a second dielectric layer 2 disposed on the bottom, a first dielectric layer 1 disposed on the top, and 35 intermediate dielectric layers 3(1) to 3(35) disposed between the first dielectric layer 1 and the second dielectric layer 2. Between the respective dielectric layers, first interlayer electrodes 8 and second interlayer electrodes 9 are arranged alternately with each other. First internal electrodes 6 and second internal electrodes 7 are formed in the intermediate dielectric layers 3. The first internal electrodes 6 are coupled to the first interlayer electrode 8. The second internal electrodes 7 are coupled to the second interlayer electrode 9. For example, the width of the first internal electrodes 6 and the second internal electrodes 7 may be 1.5 μm. For example, the distance between the first internal electrodes 6 and the second internal electrodes 7 may be 1.5 μm. For example, the distance between an end portion of the first internal electrode 6 at the surface side of the intermediate dielectric layer 3 in contact with the second interlayer electrode 9, and the second interlayer electrode 9 in contact with the intermediate dielectric layer 3 may be 2.5 μm. For example, the distance between an end portion of the second internal electrode 7 at the surface side of the intermediate dielectric layer 3 in contact with the first interlayer electrode 8, and the first interlayer electrode 8 in contact with the intermediate dielectric layer 3 may be 2.5 μm. In FIGS. 3G and 3H, the first internal electrodes 6 are exposed to one surface of the intermediate dielectric layer 3, but the second internal electrodes 7 are not exposed to the one surface. Therefore, in FIGS. 3G and 3H, the unexposed second internal electrodes 7 are indicated by dashed line. In the intermediate dielectric layer 3 of FIGS. 3E and 3F, between the first internal electrodes 6 and the second internal electrodes 7 which are arranged alternately with each other, a dielectric layer of 500 (=1,500 μm/3 μm) is present. Accordingly, the capacitance $C_1$ of the capacitor illustrated in FIGS. 3A to 3H may be estimated by the following equation.

$$C_t = C_1 + 35C_2 = C_1 + 35\varepsilon \frac{S' \times M'}{t'} = C1 + 35\varepsilon \frac{(700 \times 15) \times 500}{1.5} \doteq 67 \times C_1$$

∈ denotes a permittivity of a dielectric layer, S' denotes an area (μm²) of internal electrodes, M' denotes the number of dielectric layers laminated between first internal electrodes and second internal electrodes, and t' denotes a thickness (μm) of the dielectric layer between the first internal electrodes and the second internal electrodes.

The capacitor includes the first internal electrodes and the second internal electrodes, and thus the capacitance may be greatly increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A capacitor comprising:
   three or more dielectric layers including a first dielectric layer, a second dielectric layer, and at least one intermediate dielectric layer laminated between the first dielectric layer and the second dielectric layer;
   at least one first interlayer electrode and at least one second interlayer electrode which are arranged alternately with each other between at least two layers among the three or more dielectric layers;
   a first external electrode disposed on lateral surfaces of the three or more dielectric layers and coupled to the at least one first interlayer electrode; and
   a second external electrode disposed on lateral surfaces of the three or more dielectric layers and coupled to the at least one second interlayer electrode,
   wherein the intermediate dielectric layer includes first internal electrodes which are coupled to the first interlayer electrode, arranged in a plane direction of the intermediate dielectric layer and spaced apart from each other, and second internal electrodes which are coupled to the second interlayer electrode, arranged alternately with the first internal electrodes and spaced apart from the first internal electrodes.

2. The capacitor according to claim 1, wherein the three or more dielectric layers are optically transparent.

3. The capacitor according to claim 1, wherein a distance between an end portion of each of the first internal electrodes at a surface side of the intermediate dielectric layer in contact with the second interlayer electrode and the second interlayer electrode in contact with the intermediate dielectric layer ranges from 2 µm to 3 µm, and a distance between an end portion of each of the second internal electrodes at a surface side of the intermediate dielectric layer in contact with the first interlayer electrode and the first interlayer electrode in contact with the intermediate dielectric layer ranges from 2 µm to 3 µm.

4. The capacitor according to claim 1, wherein a distance between the first internal electrodes and the second internal electrodes is equal to or more than 1 µm.

5. The capacitor according to claim 1, wherein an average thickness of the first dielectric layer and the second dielectric layer ranges from 20 µm to 100 µm.

6. The capacitor according to claim 1, further comprising:
   a conductive material provided between the first internal electrodes and the second internal electrodes.

7. The capacitor according to claim 6, wherein the conductive material includes Au, Ag, Cu, Ni, Ag—Pt alloy or Ag—Pd alloy.

* * * * *